(12) United States Patent
Kalbe et al.

(10) Patent No.: US 11,198,974 B2
(45) Date of Patent: *Dec. 14, 2021

(54) THERMODEFORMABLE POLYMER/FIBER COMPOSITE

(71) Applicant: BASF SE, Ludwigshafen am Rhein (DE)

(72) Inventors: Michael Kalbe, Ludwigshafen (DE); Kathrin Michl, Ludwigshafen (DE); Judith Braeuer, Ludwigshafen (DE); Rainer Scheidhauer, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 669 days.

This patent is subject to a terminal disclaimer.

(21) Appl. No.: 16/077,957

(22) PCT Filed: Feb. 6, 2017

(86) PCT No.: PCT/EP2017/052488
§ 371 (c)(1),
(2) Date: Aug. 14, 2018

(87) PCT Pub. No.: WO2017/140520
PCT Pub. Date: Aug. 24, 2017

(65) Prior Publication Data
US 2021/0189655 A1  Jun. 24, 2021

(30) Foreign Application Priority Data
Feb. 15, 2016 (EP) ..................... 16155723

(51) Int. Cl.
  *D21H 17/37* (2006.01)
  *D21H 21/18* (2006.01)
  *D21H 27/28* (2006.01)
(52) U.S. Cl.
  CPC ............. *D21H 17/37* (2013.01); *D21H 21/18* (2013.01); *D21H 27/28* (2013.01)
(58) Field of Classification Search
  USPC .................................................... 162/168.7
  See application file for complete search history.

(56) References Cited

U.S. PATENT DOCUMENTS

| 4,269,749 A | 5/1981 | Marriott et al. |
| 6,841,608 B1 | 1/2005 | Dreher et al. |
| 8,012,389 B2 * | 9/2011 | Warnes ............... B27N 1/02 264/115 |
| 2009/0131561 A1 | 5/2009 | Pfaadt et al. |
| 2010/0010143 A1 | 1/2010 | Elizalde et al. |
| 2010/0170648 A1 * | 7/2010 | Elizalde ............ D21H 27/26 162/135 |
| 2020/0369840 A1 * | 11/2020 | Flory ................... C08F 2/22 |

FOREIGN PATENT DOCUMENTS

| DE | 40 03 422 A1 | 8/1991 |
| DE | 42 13 965 A1 | 11/1993 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| DE | 10 2006 001 979 A1 | 7/2007 |
| DE | 102006001979 A1 | 7/2007 |
| DE | 10 2006 006 580 A1 | 8/2007 |
| DE | 102006006580 A1 | 8/2007 |
| EP | 0 040 419 B1 | 7/1985 |
| EP | 0 567 812 A1 | 11/1993 |
| EP | 0 614 922 A2 | 9/1994 |
| EP | 0 771 328 A | 5/1997 |
| EP | 2 487 204 A1 | 8/2012 |
| EP | 2487204 A1 | 8/2012 |
| JP | 2003-511520 A | 3/2003 |
| JP | 2009-521341 A | 6/2009 |
| JP | 2010-518210 A | 5/2010 |
| WO | WO 95/33775 A1 | 12/1995 |
| WO | WO 2007/073218 A1 | 6/2007 |
| WO | 2008/095900 A1 | 8/2008 |
| WO | WO 2008/095900 A1 | 8/2008 |
| WO | 2013/120752 A1 | 8/2013 |
| WO | WO 2013/120752 A1 | 8/2013 |

OTHER PUBLICATIONS

International Preliminary Report on Patentability received for PCT Patent Application No. PCT/EP2017/052488, dated Aug. 30, 2018, 13 pages (8 pages of English Translation and 5 pages of Original Document).
International Search Report and Written Opinion received for PCT Patent Application No. PCT/EP2017/052488, dated Apr. 10, 2017,17 pages (8 pages of English Translation and 9 pages of Original Document).
International Search Report dated Apr. 10, 2017 in PCT/EP2017/052488 filed Feb. 6, 2017.

* cited by examiner

*Primary Examiner* — Mark Halpern
(74) *Attorney, Agent, or Firm* — Faegre Drinker Biddle & Reath LLP

(57) ABSTRACT

A process for producing a thermoformable polymer/fiber composite.

14 Claims, No Drawings

THERMODEFORMABLE POLYMER/FIBER COMPOSITE

This application is a 371 of PCT/EP2017/052488 filed 6 Feb. 2017

The present invention provides a process for producing a thermoformable polymer/fiber composite using a fibrous substrate and a polymer P, where
- the fibrous substrate is introduced into a gas stream, then
- the fibrous substrate in the gas stream is contacted with an aqueous dispersion of a polymer P having a glass transition temperature Tg, then
- the fibrous substrate that has been contacted with the aqueous dispersion of the polymer P is dried in the gas stream and then deposited, then
- the deposited fibrous substrate obtained is converted to a fiber web, and then
- the fiber web obtained is consolidated at a temperature≥Tg to give a thermoformable polymer/fiber composite, which comprises effecting the aqueous dispersion of the polymer P by free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and b) 0% to 20% by weight of at least one further ethylenically unsaturated monomer which differs from the monomers A1 (monomers A2), in copolymerized form, and where the monomers P are chosen in terms of type and amount such that the polymer P obtained has a glass transition temperature Tg≥20° C. measured according to DIN EN ISO 11357-2 (2013 September).

The present invention further provides the polymer/fiber composites themselves that are obtainable by the process of the invention and for the use thereof for production of polymer/fiber moldings, for example furniture moldings or wall decor parts or door leaves.

Wood fiberboards are produced essentially proceeding from round timber, but also from woodchips or what are called slabs. After the round timber has been debarked, the round timber, just like the slabs, is comminuted in drum chippers to give woodchips. After contaminants such as sand or stones have been removed, the woodchips are first subjected to a hydrothermal pretreatment by means of steam in a preliminary steam vessel at 100° C. Thereafter, the pre-steamed woodchips are transferred to what is called the boiler, where they are exposed to a temperature of 140 to 180° C. and a pressure of 4 to 8 bar (gauge) in water for two to five minutes. Thereafter, the softened woodchips are transferred into what is called the refiner, where they are ground and at the same time defibrated, likewise at a pressure of 4 to 8 bar (gauge), between two fluted grinding disks that rotate relative to one another at a distance of about 3 to 0.1 mm. Subsequently, the aqueous wood fiber pulp obtained is transferred into what is called the blowline, a tube having a much lower pressure, the effect of which is that the water evaporates and thus serves as a gaseous transport medium for the wood fibers through the blowline (hydropneumatic conveying). By additional blowing of heated dry air into the blowline, the wood fibers are dried and transported onward pneumatically. In order to assure very substantially uniform application of the aqueous thermosetting binder required for production of the wood fiberboards, such as, in particular, formaldehyde resins such as urea/formaldehyde, phenol/formaldehyde, melamine/formaldehyde, melamine/urea/formaldehyde or melamine/phenol/formaldehyde resins, or isocyanates such as methylene diisocyanate or toluidine diisocyanate, to the fibers, the aqueous thermosetting binder is sprayed into the blowline at one or more sites prior to the blowing-in of the heated dry air. The "glued" fibers obtained after the drying are separated out and converted to a fiber web (fiber mat). This fiber mat is optionally compressed by means of a 'cold' preliminary compression and then pressed under pressure and at high temperature (150 to 230° C.) to give a woodbase material in slab form having a density of 250 to 1000 kg/m³. However, the use of thermosetting binders means that the wood fiberboards thus obtained are no longer thermoformable.

For production of thermoformable shaped bodies, especially wood fiberboards, WO 2007/73218 gives a quite general disclosure of the use of thermoplastic binders in liquid or particulate form. In this connection, aqueous binder dispersions are among those mentioned. However, thermoplastic binders disclosed are quite generally suitable polymers, and a multitude of completely different polymers are mentioned in an unspecific manner, for example acrylate polymers, urethane polymers, polyvinyl chloride, polystyrene, polyvinyl alcohol, polyamides, polyesters, but also starches and derivatives thereof, cellulose derivatives, proteins, polyacids, polyisocyanates, and also reactive resin systems such as epoxy resins, unsaturated polyesters, urethane/isocyanate resins or precondensates of a wide variety of different formaldehyde resins, etc. In the examples, pellets, fibers, powders or flakes of polypropylene, acid-modified polypropylene, polylactic acid fibers, polyvinyl alcohol, polyolefin copolymer dispersions, such as ethylene/acrylic acid or ethylene/maleic anhydride copolymer dispersions, are used without further specification.

However, in-house studies show that not all aqueous dispersions of thermoplastic polymers are suitable as binders for production of thermoformable shaped bodies when the mixing of a fibrous substrate with an aqueous dispersion of a thermoplastic polymer is to be effected in a gas stream as occurs in a blowline in particular. It is especially problematic that thermoplastic binders do not stick to the wood fibers and, therefore, wood fibers and thermoplastic binders partly separate again in the course of and after drying, which means that it is not possible to ensure homogeneous and reproducible binder distribution on the wood fibers and hence homogeneous and reproducible properties of the shaped bodies obtained therewith. In addition, the shaped bodies produced with an aqueous dispersion of a thermoplastic polymer have problems with regard to unwanted subsequent deforming under the influence of temperature.

It was therefore an object of the present invention to provide a process for producing a thermoformable shaped body from fibrous substrate and an aqueous dispersion of an effectively adhering polymer which has higher thermal stability in use and hence higher use strength.

This object was surprisingly achieved by the process defined at the outset.

It is a characterizing feature of the process of the invention that a fibrous substrate is introduced into a gas stream. According to the invention, any fibrous substrates may be used. A fibrous substrate shall be understood here to mean those particles having a ratio of their longest dimension to their shortest dimension of at least ≥5, advantageously≥10 and especially advantageously≥50, and having a shortest dimension of ≤2 mm, advantageously≥0.001 and ≤0.5 mm and especially advantageously≥0.001 and ≤0.1 mm. It is essential that the shortest dimension is determined at an angle of 90° to the connecting line of the longest dimension of the particles.

The fibrous substrates may be natural fibers, such as vegetable, animal and mineral fibers, or synthetic fibers made from natural or synthetic polymers. Examples of vegetable fibers are cotton fibers, flax fibers, hemp fibers, kenaf fibers, jute fibers, wood fibers or sisal fibers, examples of animal fibers are wool or other animal hair, an example of mineral fibers is rockwool, an example of synthetic fibers of natural origin is viscose fibers, and examples of synthetic fibers based on synthetic polymers are polyester fibers such as polytrimethylene terephthalate, polyethylene naphthalate, polyethylene terephthalate or polybutylene terephthalate fibers, and the different polycarbonate fibers, polyolefin fibers such as, in particular, polyethylene or polypropylene fibers, polyamide fibers such as polycaprolactam fibers (nylon-6), polyamide fibers formed from hexamethylenediamine and adipic acid (nylon-6,6), polyamide fibers formed from hexamethylenediamine and terephthalic acid (nylon-6T), polyamide fibers formed from para-phenylenediamine and terephthalic acid (aramid), and also mineral fibers, such as glass fibers, carbon fibers or basalt fibers. Advantageously, however, the invention uses natural fibers, especially of vegetable origin and especially advantageously wood fibers as obtained from a refiner in particular.

In the context of the present invention, a gas stream shall be understood to mean the directed transport of a gaseous substance along a pressure gradient, for example in a vessel or in a tube. In principle, it is possible to use all substances which are gaseous under the transport conditions (especially pressure and temperature). For example, organic and/or inorganic solvent vapors are used, such as, especially advantageously, water vapor or nitrogenous gas mixtures such as air in particular. Advantageously in accordance with the invention, water vapor/air mixtures are used in a broad mixing ratio.

According to the invention, the fibrous substrate in the gas stream is contacted with an aqueous dispersion of a polymer P having a glass transition temperature Tg. If this contacting is effected in a blowline, advantageously via one or more injection nozzles, it should be ensured that the contacting in the blowline is effected, in flow direction, at one or more sites before the heated dry air for drying of the wood fibers is blown in.

Subsequently, the fibrous substrate that has been contacted with the aqueous dispersion of the polymer P is dried in the gas stream and then deposited. The drying of the fibrous substrate obtained is effected, for example, by removal and condensation of the water vapor or in a blowline by introduction of a sufficient amount of heated dry air that the relative air humidity in the resulting gas mixture is lowered to ≤10% or even ≤5%. This measure results in drying of the mixture of fibrous substrate and polymers P. In the context of this document, drying shall be understood to mean lowering of the residual moisture content of the substrate/polymer mixture to ≤15% by weight and advantageously to ≤10% by weight. In the context of this document, residual moisture content is understood to mean the percentage difference in weight, based on the substrate/polymer mixture used, which results when 1 g of substrate/polymer mixture is dried in a drying cabinet at 120° C. for one hour. The substrate/polymer mixture is separated out by the customary methods for separation of solids out of gas mixtures, for example by means of sieves or by exploitation of centrifugal forces via cyclone separators.

Subsequently, the separated-out substrate/polymer mixture obtained, in accordance with the invention, is converted to a fiber web, for example by appropriate scattering of the separated-out substrate/polymer mixture onto an area or, in continuous operation, onto a conveyor belt. This fiber web may, in accordance with the invention, optionally after mechanical pre-consolidation at a temperature well below the glass transition temperature Tg, have a thickness of ≥1 and ≤50 cm, advantageously≥1 and ≤30 cm and especially advantageously≥1 and ≤15 cm, and a density of ≥20 and ≤700 g/L, often≥50 and ≤500 g/L and frequently≥100 and ≤350 g/L.

Subsequently, the fiber web thus obtained is consolidated at a temperature≥Tg to give a thermoformable polymer/fiber composite. Consolidation here is understood to mean compression of the fiber web at a temperature≥Tg under pressure to give a thermoformable polymer/fiber composite. This increases the density of the polymer/fiber composite compared to the corresponding fiber web, depending on the fibrous substrate used, by a factor of ≥3 and advantageously by a factor of ≥6. In a corresponding manner, there is also a decrease in the thickness of the polymer/fiber composite compared to the corresponding fiber web. What is of significance in this connection is that the polymer/fiber composite of the invention advantageously has a two-dimensional flat shape. It will be appreciated that the polymer/fiber composite of the invention may alternatively—depending on the press mold chosen—have any desired non-flat three-dimensional forms.

It is essential to the process that the aqueous dispersion of the polymer P has been prepared by free-radically initiated emulsion polymerization of a mixture of ethylenically unsaturated monomers P [monomers P] in an aqueous medium in the presence of a polymer A, where the polymer A is formed from

| | |
|---|---|
| 80% to 100% by weight of | at least one ethylenically unsaturated mono- and/or dicarboxylic acid [monomers A1] and |
| 0% to 20% by weight of | at least one further ethylenically unsaturated monomer which differs from the monomers A1 (monomers A2), in copolymerized form. |

Useful monomers A1 especially include α,β-monoethylenically unsaturated mono- and dicarboxylic acids having from 3 to 6 carbon atoms, possible anhydrides of these, and also water-soluble salts of these, in particular alkali metal salts of these, examples being acrylic acid, methacrylic acid, maleic acid, fumaric acid, itaconic acid, citraconic acid, tetrahydrophthalic acid, and anhydrides of these, for example maleic anhydride, and also the sodium or potassium salts of the abovementioned acids. Particular preference is given to acrylic acid, methacrylic acid, maleic acid and/or maleic anhydride, and acrylic acid is especially preferred.

Useful monomers as the at least one monomer A2 for preparation of the polymer A used in accordance with the invention are especially ethylenically unsaturated compounds that are free-radically copolymerizable with monomer A1 in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$ conjugated dienes, such as 1,3-butadiene (butadiene) and isoprene. The monomers mentioned are generally the main monomers, and these combine to form a proportion of ≥50% by weight, preferably ≥80% by weight and especially preferably ≥90% by weight, based on the entirety of the monomers A2, or indeed form the entirety of monomers A2. The solubility of these monomers in water under standard conditions [20° C., 1 atm (absolute)] is very generally only moderate to low.

Monomers A2 which have higher water solubility under the abovementioned conditions are those which comprise either at least one sulfo group and/or anion corresponding thereto or at least one amino, amido, ureido, or N-heterocyclic group, and/or nitrogen-protonated or -alkylated ammonium derivatives thereof. Examples include acrylamide and methacrylamide; and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide, and 2-(1-imidazolin-2-onyl)ethyl methacrylate. The abovementioned water-soluble monomers A2 are usually present merely as modifying monomers in amounts of ≤10% by weight, preferably ≤5% by weight and especially preferably ≤3% by weight, based on the entirety of monomers A2.

Monomers A2 which typically increase the internal strength of the filmed polymer matrix normally have at least one epoxy, hydroxyl, N-methylol, or carbonyl group, or at least two non-conjugated ethylenically unsaturated double bonds. Examples of these are monomers having two vinyl moieties, monomers having two vinylidene moieties, and also monomers having two alkenyl moieties. Particularly advantageous monomers here are the diesters of dihydric alcohols α,β-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular importance in this context are the $C_1$-$C_8$-hydroxyalkyl esters of methacrylic and of acrylic acid, for example n-hydroxyethyl, n-hydroxypropyl, or n-hydroxybutyl acrylate and the corresponding methacrylate, and also compounds such as diacetoneacrylamide and acetylacetoxyethyl acrylate and the corresponding methacrylate. Frequently, the aforementioned crosslinking monomers A2 are used in amounts of ≤10% by weight, but preferably in amounts of ≤5% by weight, based in each case on the entirety of monomers A2. However, it is especially preferable not to use any of these crosslinking monomers A2 to produce the polymer A.

Advantageously, the polymers A are prepared by using, as monomers A2, only those monomer mixtures which comprise

| | |
|---|---|
| 90% to 100% by weight of | esters of acrylic and/or methacrylic acid with alcohols having 1 to 12 carbon atoms, or |
| 90 to 100% by weight of | styrene and/or butadiene, or |
| 90 to 100% by weight of | vinyl chloride and/or vinylidene chloride, or |
| 90% to 100% by weight of | vinyl acetate, vinyl propionate and/or ethylene. |

According to the invention, the copolymerized proportion of monomers A2 in the polymer A is 0% to 20% by weight, advantageously≤10% by weight or ≤5% by weight and ≥0.1% by weight. In a further advantageous embodiment, the polymer A does not comprise any monomers A2 in copolymerized form at all. Accordingly, polymer A is formed to an extent of ≥80% by weight, advantageously to an extent of ≥90% by weight or ≥95% by weight, and in a further embodiment to an extent of 100% by weight of monomers A1 in copolymerized form, particularly preferred monomers A1 being acrylic acid, methacrylic acid, maleic acid and/or maleic anhydride.

The polymers A used in accordance with the invention are generally prepared by free-radically initiated polymerization of the monomers A in an aqueous medium. Advantageously, the polymers A are prepared in the presence of at least one free-radical chain transfer agent, particular preference being given to sulfur-, nitrogen- and/or phosphorus-containing free-radical chain transfer agents having a solubility of ≥5 g/100 g of water in deionized water at 20° C. and 1 atm.

The principles underlying the preparation of the polymers A are familiar to the person skilled in the art (see by way of example A. Echte, Handbuch der Technischen Polymerchemie [Handbook of Industrial Polymer Chemistry], chapter 6, VCH, Weinheim, 1993 or B. Vollmert, Grundriss der Makromolekularen Chemie [Principles of Macromolecular Chemistry], vol. 1, E. Vollmert Verlag, Karlsruhe, 1988).

Sulfur-containing free-radical chain transfer agents used are, for example, mercaptoalkanols such as 2-mercaptoethanol, 2-mercaptopropanol or 3-mercaptopropanol, alkali metal hydrogensulfites such as sodium hydrogensulfite or potassium hydrogensulfite, and thiosulfuric acid and the alkali metal salts thereof or 3-mercapto-2-aminopropanoic acid (cysteine), nitrogen-containing free-radical chain transfer agents used are, for example, hydroxylamine(ammonium) compounds such as hydroxylammonium sulfate, and phosphorus-containing free-radical chain transfer agents used are, for example, phosphorous acid, hypophosphorous acid, metaphosphorous acid, orthophosphoric acid, pyrophosphoric acid or polyphosphoric acid and the alkali metal salts thereof, especially the sodium or potassium salts thereof, advantageously sodium hypophosphite or sodium dihydrogenphosphate.

Especially advantageously, the free-radical chain transfer agent is selected from hypophosphorous acid and the alkali metal salts thereof, especially sodium hypophosphite, alkali metal hydrogensulfites, especially sodium hydrogensulfite, hydroxylammonium sulfate and/or 2-mercaptoethanol.

In the preparation of the polymers A, it is advantageous when the amount of the free-radical chain transfer agent is chosen such that the number-average molecular weight of the polymers A is ≥1000 and ≤30 000 g/mol, advantageously≥2000 and ≤20 000 g/mol and especially advantageously≥3000 and ≤20 000 g/mol. The required amount of the free-radical chain transfer agent and the corresponding polymerization conditions are known to the person skilled in the art or can be ascertained by such a person in simple routine tests.

The weight-average molecular weights of the polymers A are determined in a manner familiar to the person skilled in the art according to DIN 55672-1 by gel permeation chromatography (for example linear column: Supremea M from PSS, eluent: 0.08 mol/l TRIS buffer pH 7.0, deionized water, liquid flow rate: 0.8 mL/min, detector: ERC 7510 differential refractometer from ERC, internal standard/calibration substance: sodium polyacrylate).

In the preparation of the polymer P used in accordance with the invention, it is possible if appropriate to initially charged a portion or the entirety of polymers A in the aqueous polymerization medium. Alternatively, it is possible to meter in the entirety or any remaining residual amount of polymers A together with the monomers P during the polymerization reaction. The manner in which the entirety or any remaining residual amount of polymers A is metered into the aqueous polymerization medium here can be discontinuous in one or more portions, or continuous with constant or varying flow rates. Advantageously, the entirety of polymers A is initially charged in the aqueous polymerization medium prior to triggering of the polymerization reaction of the monomers P. In a further advantageous embodiment, the polymer A is prepared in situ in the polymerization medium for the polymerization of the monomers P.

What is of significance is that the aqueous polymerization medium, in the preparation of the polymer P, as well as the polymer A, may additionally also comprise dispersing aids which keep both the monomer droplets and the dispersion particles of the polymer P obtained by the free-radically initiated polymerization of the monomers P dispersed in the aqueous phase and hence ensure the stability of the aqueous polymer composition produced. These may be not only the protective colloids usually used in the conduct of free-radical aqueous emulsion polymerization reactions, but also emulsifiers.

Suitable protective colloids are, for example, polyvinyl alcohols, cellulose derivatives or copolymers comprising vinyl pyrrolidone. A detailed description of other suitable protective colloids is found in Houben-Weyl, Methoden der organischen Chemie [Methods of Organic Chemistry], vol. XIV/1, Makromolekulare Stoffe [Macromolecular Materials], pages 411 to 420, Georg-Thieme-Verlag, Stuttgart, 1961. Since the polymer A used in accordance with the invention can also act as a protective colloid, it is advantageous in accordance with the invention not to use any additional protective colloids.

It is also possible, of course, to use mixtures of emulsifiers and/or protective colloids. Dispersing aids frequently used are exclusively emulsifiers having relative molecular weights that are typically below 1000 g/mol, by contrast with the protective colloids. They may be either anionic, cationic, or nonionic. When mixtures of surface-active substances are used, the individual components must, of course, be compatible with one another, and in case of doubt this can be checked by a few preliminary experiments. Anionic emulsifiers are generally compatible with one another and with nonionic emulsifiers. The same also applies to cationic emulsifiers, whereas anionic and cationic emulsifiers are mostly not compatible with one another.

Commonly used emulsifiers are, for example, ethoxylated mono-, di- and trialkylphenols (EO level: 3 to 50, alkyl radical: $C_4$ to $C_{12}$), ethoxylated fatty alcohols (EO level: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO level: 3 to 30, alkyl radical: $C_{12}$ to $C_{18}$) and ethoxylated alkylphenols (EO level: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Other suitable emulsifiers are found in Houben-Weyl, Methoden der organischen Chemie, vol. XIV/1, Makromolekulare Stoffe, pages 192 to 208, Georg-Thieme-Verlag, Stuttgart, 1961.

Further useful interface-active substances have been found to be compounds of the general formula I

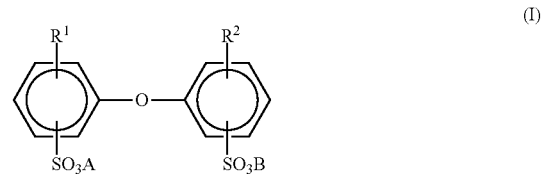

in which $R^1$ and $R^2$ are $C_4$- to $C_{24}$-alkyl and one of the $R^1$ and $R^2$ radicals may also be hydrogen, and A and B may be alkali metal ions and/or ammonium ions. In the general formula I, $R^1$ and $R^2$ are preferably linear or branched alkyl radicals having 6 to 18 carbon atoms, especially having 6, 12 or 16 carbon atoms, or hydrogen atoms, where $R^1$ and $R^2$ are not both simultaneously hydrogen atoms. A and B are preferably sodium, potassium or ammonium ions, with sodium ions being particularly preferred. Particularly advantageous compounds I are those in which A and B are sodium ions, $R^1$ is a branched alkyl radical having 12 carbon atoms and $R^2$ is a hydrogen atom or $R^1$. Technical grade mixtures comprising a proportion of 50% to 90% by weight of the monoalkylated product, for example Dowfax® 2A1 (brand of Dow Chemical Company), are frequently used. The compounds I are common knowledge, for example from U.S. Pat. No. 4,269,749, and are commercially available.

If dispersing aids are included in the preparation of the aqueous dispersion of the polymer P, the total amount of dispersing aids used, especially emulsifiers, is 0.1% to 5% by weight, preferably 1% to 3% by weight, based in each case on the total amount of the monomers P (total amount of monomers P). In an advantageous embodiment, emulsifiers are used as the sole dispersing aids.

If dispersing aids are included in the preparation of the aqueous dispersion of the polymer P, it is possible if appropriate to initially charge a portion or the entirety of dispersing aids as a constituent of the aqueous medium comprising the polymer A. Alternatively, it is possible to meter in the entirety or any remaining residual amount of dispersing aids together with the monomers P during the polymerization reaction. The manner in which the entirety or any remaining residual amount of dispersing aids is metered into the aqueous polymerization medium here can be discontinuous in one or more portions, or continuous with constant or varying flow rates.

It is essential to the invention that, in the free-radically initiated aqueous emulsion polymerization of the monomers P, these have been chosen in terms of type and amount such that the polymer P obtained has a glass transition temperature Tg≥20° C., advantageously≥60° C. and especially advantageously≥90° C., measured according to DIN EN ISO 11357-2 (2013 September).

The conduct of free-radically initiated emulsion polymerizations of ethylenically unsaturated compounds (monomers) in an aqueous medium has already been widely described and is therefore well known to the person skilled in the art [in this regard see Emulsionspolymerisation [Emulsion Polymerization] in Encyclopedia of Polymer Science and Engineering, volume 8, pages 659 ff. (1987); D. C. Blackley, in High Polymer Latices, volume 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A-40 03 422 and Dispersionen synthetischer Hochpolymerer [Dispersions of Synthetic High Polymers], F. Hölscher, Springer-Verlag, Berlin (1969)]. The free-radically initiated aqueous emulsion polymerization is typically effected by dispersing the monomers, generally with inclusion of dispersing aids, such as emulsifiers and/or protective colloids, in aqueous medium and polymerizing them using at least one water-soluble free-radical polymerization initiator. Frequently, the residual contents of unconverted monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or further customary added substances, for example foam- or viscosity-modifying additives, are added to the aqueous polymer dispersion. The preparation of an aqueous dispersion of the polymer P used in accordance with the invention differs from this general procedure merely in that the monomers P are polymerized in the presence of at least one polymer A and are chosen in terms of type and amount such that the polymers P formed have a glass transition temperature Tg≥20° C. measured according to DIN EN ISO 11357-2 (2013 September). It will be appreciated here that, for preparation of the polymers P, the scope of the present document is also to include the seed, staged and gradient modes of polymerization that are familiar to the person skilled in the art. If staged polymers are used, at least the polymer from one stage has a glass transition temperature Tg≥20° C. Advantageously at least 50% by weight and particularly advantageously at least 90% by weight of the staged polymer comprises a polymer P having a glass transition temperature Tg≥20° C., advantageously≥60° C. and especially advantageously≥90° C. Advantageously in accordance with the invention, however, one-stage polymers having a glass transition temperature Tg≥20° C., advantageously≥60° C. and especially advantageously≥90° C. are used as polymers P.

Useful monomers P are especially monomers that are free-radically polymerizable in a simple manner, for example ethylene, vinylaromatic monomers such as styrene, α-methylstyrene, o-chlorostyrene or vinyltoluenes, vinyl halides such as vinyl chloride or vinylidene chloride, esters derived from vinyl alcohol and from monocarboxylic acids having 1 to 18 carbon atoms, for example vinyl acetate, vinyl propionate, vinyl n-butyrate, vinyl laurate, and vinyl stearate, esters derived from α,β-monoethylenically unsaturated mono- and dicarboxylic acids having preferably from 3 to 6 carbon atoms, particular examples being acrylic acid, methacrylic acid, maleic acid, fumaric acid, and itaconic acid, with alkanols generally having 1 to 12, preferably 1 to 8 and especially 1 to 4 carbon atoms, particular examples being the methyl, ethyl, n-butyl, isobutyl, pentyl, hexyl, heptyl, octyl, nonyl, decyl, and 2-ethylhexyl esters of acrylic and of methacrylic acid, the dimethyl or di-n-butyl esters of fumaric and of maleic acid, nitriles of α,β-monoethylenically unsaturated carboxylic acids, for example acrylonitrile, methacrylonitrile, fumaronitrile, maleonitrile, and also $C_{4-8}$ conjugated dienes, such as 1,3-butadiene and isoprene. The monomers mentioned are generally the main monomers, and these combine to form a proportion of ≥80% by weight and preferably ≥90% by weight, based on the amount of all monomers P used to prepare the polymer P (total amount of monomers P). The solubility of these monomers in water under standard conditions [20° C., 1 atm (=1.013 bar absolute)] is very generally only moderate to low.

Monomers P which have higher water solubility under the abovementioned conditions are those which comprise either at least one acid group and/or anion corresponding thereto or at least one amino, amido, ureido, or N-heterocyclic group, and/or nitrogen-protonated or -alkylated ammonium derivatives thereof. Examples include α,β-monoethylenically unsaturated mono- and dicarboxylic acids and amides thereof, e.g. acrylic acid, methacrylic acid, maleic acid, fumaric acid, itaconic acid, acrylamide, and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-aminoethyl acrylate, 2-aminoethyl methacrylate, 2-aminopropyl acrylate, 2-aminopropyl methacrylate, 3-aminopropyl acrylate, 3-aminopropyl methacrylate, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The aforementioned monomers P are normally present merely as modifying monomers in amounts of ≤10% by weight and preferably ≤5% by weight, based on the total amount of monomers P.

Monomers P which typically increase the internal strength of the filmed polymer matrix normally have at least one epoxy, hydroxyl, N-methylol or carbonyl group, or at least two non-conjugated ethylenically unsaturated double bonds. Examples of these are monomers having two vinyl moieties, monomers having two vinylidene moieties, and also monomers having two alkenyl moieties. Particularly advantageous monomers here are the diesters of dihydric alcohols with α,β-monoethylenically unsaturated monocarboxylic acids, and among these preference is given to acrylic and methacrylic acid. Examples of monomers of this type having two non-conjugated ethylenically unsaturated double bonds are alkylene glycol diacrylates and alkylene glycol dimethacrylates, for example ethylene glycol diacrylate, propylene 1,2-glycol diacrylate, propylene 1,3-glycol diacrylate, butylene 1,3-glycol diacrylate, butylene 1,4-glycol diacrylate and ethylene glycol dimethacrylate, propylene 1,2-glycol dimethacrylate, propylene 1,3-glycol dimethacrylate, butylene glycol 1,3-dimethacrylate, butylene glycol 1,4-dimethacrylate, and also 1,2-, 1,3- or 1,4-divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Other materials of particular significance in this context are the C1-C8-hydroxyalkyl esters of methacrylic and of acrylic acid, for example 2-hydroxyethyl, 2-hydroxypropyl or 3-hydroxy- or 4-hydroxybutyl acrylate and the corresponding methacrylate, and also compounds such as diacetoneacrylamide and acetylacetoxyethyl acrylate and the corresponding methacrylate. Frequently, the aforementioned monomers are used in amounts of ≤10% by weight, but preferably in amounts≤5% by weight, based in each case on the total amount of monomers P.

In a preferred embodiment, the monomers P in the preparation of the polymers P are selected to an extent of ≥90% by weight from the group comprising olefins, vinylaromatic monomers, vinyl halides, esters of vinyl alcohol and monocarboxylic acids having 1 to 18 carbon atoms, esters of α,β-monoethylenically unsaturated mono- and dicarboxylic acids having 3 to 6 carbon atoms with alkanols having 1 to 12 carbon atoms, nitriles of α,β-monoethylenically unsaturated carboxylic acids and $C_{4-8}$-conjugated dienes, and are selected to an extent of ≤10% by weight from the group comprising α,β-monoethylenically unsaturated mono- and dicarboxylic acids having 3 to 6 carbon atoms and amides thereof, and also monoethylenically unsaturated compounds having at least one amino, epoxy, hydroxyl, N-methylol or carbonyl group and compounds having at least two nonconjugated ethylenically unsaturated double bonds.

In a further preferred embodiment, the polymer P is prepared using

The free-radically initiated aqueous emulsion polymerization for preparation of the polymers P is generally conducted in the presence of 0.1% to 5% by weight, preferably 0.1% to 4% by weight and especially 0.1% to 3% by weight, based in each case on the total amount of monomers P, of a free-radical polymerization initiator (free-radical initiator). Useful free-radical initiators are all those initiators that are capable of triggering a free-radical aqueous emulsion polymerization. These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts thereof, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). It is of course also possible to use what are called redox initiator systems as free-radical initiators. Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example

| | |
|---|---|
| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤10.0% by weight of | acrylic acid, methacrylic acid, glycidyl acrylate, glycidyl methacrylate, 2-hydroxyethyl, 2-hydroxypropyl and 3-hydroxypropyl acrylate and methacrylate, 2-aminoethyl, 2-aminopropyl and 3-aminopropyl acrylate and methacrylate, butylene 1,4-glycol diacrylate and -methacrylate, 1,2-, 1,3- and 1,4-divinylbenzene, allyl acrylate and/or allyl methacrylate, | where the amounts add up to 100% by weight.

In a further preferred embodiment, the polymer P is prepared using potassium and/or sodium hydrogensulfite, alkali metal metabisulfites, for example potassium and/or sodium meta-

| | |
|---|---|
| ≥90% and ≤99.9% by weight of | styrene and/or methyl methacrylate, |
| ≥0% and ≤9.9% by weight of | n-butyl acrylate and/or 2-ethylhexyl acrylate, and |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, | where the amounts add up to 100% by weight.

In a particularly preferred embodiment, the polymer P is prepared using bisulfite, formaldehydesulfoxylates, for example potassium and/or sodium formaldehydesulfoxylate, alkali metal salts,

| | |
|---|---|
| ≥90% and ≤99.7% by weight of | styrene and/or methyl methacrylate, |
| ≥0% and ≤9.9% by weight of | n-butyl acrylate and/or 2-ethylhexyl acrylate, and |
| ≥0.1% and ≤5.0% by weight of | acrylic acid, methacrylic acid, 2-hydroxyethyl, 2-hydroxypropyl and 3-hydroxypropyl acrylate and/or methacrylate and 2-aminoethyl, 2-aminopropyl and 3-aminopropyl acrylate and/or methacrylate, |
| ≥0.1% and ≤2.0% by weight of | butylene 1,4-glycol diacrylate and -methacrylate, 1,2-, 1,3- and 1,4-divinylbenzene, allyl acrylate and/or allyl methacrylate, and |
| ≥0.1% and ≤3.0% by weight of | glycidyl acrylate and/or glycidyl methacrylate, | where the amounts add up to 100% by weight.

specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

As well as the seed-free mode of preparation, the polymer particle size can also be adjusted by effecting the emulsion polymerization for preparation of the polymers P by the seed latex process or in the presence of a seed latex produced in situ. Processes for this purpose are known to those skilled in the art and can be found in the prior art (see, for example, EP-B 40 419, EP-A 567 812, EP-A 614 922 and 'Encyclopedia of Polymer Science and Technology', Vol. 5, page 847, John Wiley & Sons Inc., New York, 1966). For instance, the prior art recommends, in the semicontinuous feed process, initially charging a defined finely divided seed polymer dispersion in the aqueous polymerization medium and then polymerizing the monomers P in the presence of the seed latex. In this case, the seed polymer particles act as 'polymerization seeds' and decouple the polymer particle formation and polymer particle growth. During the emulsion polymerization, it is possible in principle to add further seed latex directly to the aqueous polymerization medium. This achieves broad size distributions of the polymer particles, which are often desirable especially in the case of polymer dispersions having a high solids content (in this regard, cf., for example, DE-A 4213965). Rather than the addition of a defined seed latex, it can also be produced in situ. For this purpose, for example, a portion of the monomers P used for polymerization and of the free-radical initiator is initially charged together with a portion or the entirety of the polymer A and, if appropriate, additional dispersing aids and heated to reaction temperature, forming a relatively finely divided polymer seed. Subsequently, in the same aqueous polymerization medium, the actual polymerization is conducted by the feed method (see also DE-A 4213965).

Advantageously, the polymers P are prepared by free-radically initiated aqueous emulsion polymerization at a reaction temperature in the range from 0 to 170° C., but particular preference is given to temperatures of 70 to 120° C. and especially 80 to 100° C. The free-radical aqueous emulsion polymerization can be conducted at a pressure less than, equal to or greater than 1 atm (absolute). Preference is given to polymerizing volatile monomers, such as ethylene, butadiene or vinyl chloride, under elevated pressure. In this case, the pressure may assume values of 1.2, 1.5, 2, 5, 10, 15 bar (gauge) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the monomers is conducted at 1 atm (=atmospheric pressure=1.013 bar absolute) or under elevated pressure under inert gas atmosphere, for example under nitrogen or argon.

In the free-radically initiated aqueous emulsion polymerization, the aqueous polymerization medium may in principle also comprise minor amounts (<5% by weight) of water-soluble organic solvents, for example methanol, ethanol, isopropanol, butanols, pentanols, but also acetone, etc. Preferably, however, the free-radically initiated aqueous emulsion polymerization is effected in the absence of such solvents.

The polymers P used in accordance with the invention have a glass transition temperature $Tg \geq 20°$ C. measured according to DIN EN ISO 11357-2 (2013 September). Advantageously, the glass transition temperature of the polymers P is within the range of $\geq 60°$ C., especially within the range of $\geq 60$ and $\leq 150°$ C. and particularly advantageously within the range of $\geq 90°$ C., especially within the range of $\geq 90$ and $\leq 120°$ C.

It is also of significance that, according to Fox (T. G. Fox, Bull. Am. Phys. Soc. 1956 [Ser. II] 1, page 123 and according to Ullmann's Encyclopädie der technischen Chemie [Ullmann's Encyclopedia of Industrial Chemistry], vol. 19, page 18, 4th edition, Verlag Chemie, Weinheim, 1980), the glass transition temperature of at most lightly crosslinked copolymers can be estimated in a good approximation by the following equation:

$$1/Tg = x_1/Tg^1 + x_2/Tg^2 + \ldots x_n/Tg^n,$$

where $x_1, x_2, \ldots x_n$ are the mass fractions of the monomers 1, 2, ... n and $Tg^1, Tg^2, \ldots Tg^n$ are the glass transition temperatures in degrees kelvin of the homopolymers synthesized from only one of the monomers 1, 2, ... n at a time. The glass transition temperatures of these homopolymers of most ethylenically unsaturated monomers are known (or can be ascertained experimentally in a simple manner known per se) and are listed, for example, in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and in Ullmann's Encyclopedia of Industrial Chemistry, page 169, Verlag Chemie, Weinheim, 1992.

The aqueous dispersions of the polymer P obtainable by emulsion polymerization typically have a solids content of $\geq 10\%$ and $\leq 70\%$ by weight, frequently $\geq 20\%$ and $\leq 65\%$ by weight and often $\geq 25\%$ and $\leq 60\%$ by weight, based in each case on the aqueous polymer dispersion.

Particularly advantageously, the polymers P are in the form of particles having an average particle diameter $\geq 10$ and $\leq 1000$ nm, advantageously $\geq 30$ and $\leq 600$ nm and particularly advantageously $\geq 100$ to $\leq 500$ nm, determined by the method of quasielastic light scattering (ISO Standard 13 321; cumulant z-average).

According to the invention, the weight ratio of polymers P (calculated as the total amount of monomers P) to polymers A is within the range of $\geq 1$ and $\leq 10$, advantageously within the range of $\geq 1.5$ and $\leq 8$ and especially within the range of $\geq 2$ and $\leq 6$.

In the production of the polymer/fiber composite, advantageously $\geq 1$ and $\leq 50$ g and particularly advantageously $\geq 5$ and $\leq 25$ g of polymers P (calculated as the sum total of polymers A and the total amount of monomers P), based on 100 g of fibrous substrate, are used.

By the process of the invention, in particular, thermoformable polymer/fiber composites having a basis weight of $\geq 1000$ and $\leq 30\ 000$ g/m$^2$, especially advantageously $\geq 1000$ and $\leq 20\ 000$ g/m$^2$ and advantageously $\geq 1000$ and $\leq 10\ 000$ g/m$^2$ are obtainable. In this context, the thermoformable polymer/fiber composites obtainable by the process of the invention, in a preferred embodiment, are two-dimensional, whereas, in a further preferred embodiment, they have a non-flat three-dimensional structure.

The invention also encompasses the thermoformable polymer/fiber composites as obtainable by the process of the invention.

In a corresponding manner, the invention also encompasses the use of a thermoformable polymer/fiber composite of the invention for production of a polymer/fiber molding which differs from the thermoformable polymer/fiber composite used in terms of its shape.

Accordingly, the invention also encompasses a process for producing a polymer/fiber molding, which comprises heating a thermoformable polymer/fiber composite of the invention up to a temperature≥Tg, converting the polymer/fiber composite thus obtained at a temperature≥Tg to the desired shape of the polymer/fiber molding and then cooling the polymer/fiber molding obtained down to a temperature<Tg while retaining its shape.

According to the invention, the polymer/fiber composite is heated up to a temperature corresponding at least to the glass transition temperature Tg of the polymer P. Advantageously, the polymer/fiber composite is heated up to a temperature Tg+≥10° C. and particularly advantageously Tg+≥30° C.

It is also significant that, in one embodiment, the polymer/fiber molding is produced by means of a heated mold press, the contact surface of which has a temperature≥Tg and the shape of which corresponds to the negative mold of the polymer/fiber molding, and said molding is cooled outside the mold press. In this embodiment, the heating operation and forming operation are effected in the heated mold press. It will be appreciated that it is also possible in accordance with the invention that the polymer/fiber composite is heated up to a temperature≥Tg outside the mold press and then formed within the mold press without further heating to give the polymer/fiber molding. In this embodiment, the heating operation and the forming operation are effected separately.

In an advantageous embodiment, the process of the invention is effected in such a way that, before or after the heating operation but before the forming step, an intermediate process step is also conducted in which a two-dimensional decor material having a thickness of ≤10 mm is applied to one and/or the other surface of the polymer/fiber composite.

The decor material usable in accordance with the invention is advantageously a textile fabric, for example a nonwoven material, a weave or a knit made from natural or synthetic fibers, a polymer film, for example a thermoplastic polyvinyl chloride, polyolefin or polyester film, a foamed sheetlike material, for example a sheetlike material composed of a polyolefin or polyurethane foam, a foamed sheetlike material which has in turn been coated (laminated) on the surface that does not come into contact with the heated polymer/fiber composite with a textile fabric, a polymer film or a further foamed sheetlike material, or a wood veneer.

The sheetlike decor material generally has a thickness of ≤10 mm. If the sheetlike decor material is a textile fabric or a polymer film, the thickness thereof is generally ≤3 mm, frequently advantageously≤2 mm and frequently especially advantageously≤1 mm. If, however, the sheetlike decor material is a foamed sheetlike material or a coated (laminated) foamed sheetlike material, the thickness thereof is frequently≤8 mm, often≤5 mm and particularly often≤3 mm. If the sheetlike decor material is a wood veneer, however, the thickness thereof is generally ≤3 mm, frequently advantageously≤2 mm and frequently especially advantageously≤1 mm.

The invention therefore also encompasses the polymer/fiber moldings obtainable by the aforementioned process.

It is also of significance in accordance with the invention that both the process for production of the thermoformable polymer/fiber composite and the process for production of the polymer/fiber molding can be effected continuously or batchwise.

The polymer/fiber moldings obtainable in accordance with the invention have good thermal dimensional stability and are therefore advantageously suitable as a component in motor vehicle construction, for example as a door insert, door decor element, knee bolster, glovebox, parcel shelf, sunvisor, center console, rear trunk cladding or seat back cladding, in building materials, for example as a room divider, dividing wall, cover panel or wall decor part, and in furniture as a furniture molding, for example as a seat or backrest surface, particular preference being given to use as a wall decor part or furniture molding.

The invention is to be elucidated by nonlimiting examples which follow.

EXAMPLES

Production of an Aqueous Polymer P1 Dispersion in the Presence of a Polymer A (Dispersion 1)

A 500 L pilot plant reactor equipped with a stirrer, a reflux condenser and metering devices was initially charged at 20 to 25° C. (room temperature) and under a nitrogen atmosphere with 36.5 kg of deionized water, and heated up to 95° C. under atmospheric pressure (1.013 bar absolute) while stirring. On attainment of this temperature, 14.0 kg of a 7% by weight aqueous solution of sodium persulfate were metered in continuously while stirring within 10 minutes. Subsequently, the following were metered continuously into the reaction vessel at constant flow rates while stirring and while maintaining the aforementioned temperature, each commencing at the same time: a mixture of 61.6 kg of acrylic acid, 3.2 kg of methyl methacrylate and 40.5 kg of deionized water within 70 minutes, and a mixture of 14.0 kg of a 40% by weight aqueous solution of sodium hydrogensulfite and 1.4 kg of deionized water, likewise within 70 minutes, and 32.5 kg of a 7% by weight aqueous solution of sodium persulfate within 75 minutes. Subsequently, the polymerization mixture was stirred for a further 5 minutes and then cooled down to 93° C. Thereafter, 13.9 kg of 25% by weight sodium hydroxide solution were metered in while stirring within 10 minutes and hence a pH of 3.3 was established, followed by stirring for a further 5 minutes. Subsequently, feed 1 was metered in within 170 minutes, with addition first of 48% by weight of feed 1 within 20 minutes and then of 52% by weight of feed 1 within 150 minutes—each continuously at constant flow rates. Feed 1 consisted of 21.8 kg of a 7% by weight aqueous solution of sodium persulfate. 5 minutes after the start of feed 1, feed 2 was metered in continuously at constant flow rate while maintaining the aforementioned polymerization temperature within 150 minutes. Feed 2 consisted of a homogeneous emulsion produced from 28.4 kg of deionized water, 3.86 kg of a 28% by weight aqueous solution of sodium lauryl ether sulfate (Disponil® FES 27; product from BASF SE), 2.88 kg of a 15% by weight aqueous solution of sodium dodecylsulfate (Disponil® SDS 15; product from BASF SE), 4.54 kg of glycidyl methacrylate, 1.06 kg of butane-1,4-diol diacrylate, 57.00 g of methyl methacrylate, 86.48 kg of styrene and 2.12 kg of acrylic acid. After the addition of feed 1 had ended, stirring was continued for another 10 minutes. Subsequently, 108 g of a defoamer (TEGO® Foamex 822; product from Evonik Resource Efficiency GmbH) were added. Thereafter, the polymerization mixture was cooled down to 90° C., and feeds 3 and 4, commencing simultaneously, were added continuously at constant flow rates within 30 minutes. Feed 3 consisted of 650 g of a 10% by weight aqueous solution of tert-butyl hydroperoxide, and feed 4 consisted of 820 g of a 13.1% by weight aqueous solution of acetone bisulfite (molar 1:1 addition product of acetone and sodium hydrogensulfite). Thereafter, the polymerization mixture obtained was cooled down to room temperature and filtered through a 125 μm filter. The aqueous polymer dispersion obtained had a solids content of 53.5% by weight. The number-average particle size was determined as 347 nm and the glass transition temperature as 103° C.

The solids content was generally determined with a Mettler Toledo moisture analyzer by drying of 0.5 to 1 g of a polymer dispersion or polymer solution obtained to constant weight at 140° C.

The glass transition temperature was generally determined with the aid of a TA Instruments Q 2000 differential calorimeter. The heating rate was 10 K per minute.

The number-average particle size of the dispersion particles was generally determined by dynamic light scattering on a 0.005 to 0.01% by weight aqueous dispersion at 23° C. using an Autosizer 110 from Malvern Instruments, England. What is reported is the cumulant z-average diameter of the measured autocorrelation function (ISO Standard 13321).

The pH values were generally determined by analyzing a sample with a Schott pH electrode at room temperature.

Production of an Aqueous Polymer A Solution
(Comparative Solution)

A 200 L pilot plant reactor equipped with a stirrer, a reflux condenser and metering devices was initially charged at room temperature and under a nitrogen atmosphere with 36.5 kg of deionized water, and heated up to 95° C. under atmospheric pressure while stirring. On attainment of this temperature, 14.0 kg of a 7% by weight aqueous solution of sodium persulfate were metered in continuously while stirring within 10 minutes. Subsequently, the following were metered continuously into the reaction vessel at constant flow rates while stirring and while maintaining the aforementioned polymerization temperature, commencing at the same time: a mixture of 61.6 kg of acrylic acid, 3.2 kg of methyl methacrylate and 40.5 kg of deionized water within 70 minutes, and a mixture of 14.0 kg of a 40% by weight aqueous solution of sodium hydrogensulfite and 1.4 kg of deionized water, likewise within 70 minutes, and 32.5 kg of a 7% by weight aqueous solution of sodium persulfate within 75 minutes. Thereafter, the polymerization mixture was stirred for a further 5 minutes and then cooled down to room temperature. The polymer solution obtained had a pH of 1.3 and a solids content of 36.6% by weight. The viscosity was determined as 20 mPas. The number-average molecular weight Mn of the polycarboxylic acid obtained was 2560 g/mol and the weight-average molecular weight Mw 6150 g/mol.

The viscosity was determined by the Brookfield method (ISO 2555, 1989) at 23° C.

The molecular weight was determined using two series-connected Tosoh TSKgel G 3000 PWXL columns at a temperature of 35° C., an eluent (deionized water with 0.01 mol/l phosphate buffer, pH 7.4, and 0.01 mol/l $NaN_3$), a flow rate of 0.5 mL per minute, an injection volume of 100 μL, a concentration of the injected solution of 1 to 2 mg/mL, and a DRI detector from Agilent Technologies GmbH.

Production of an Aqueous Polymer P Dispersion in the Absence of a Polymer A (Comparative Dispersion)

A 500 L pilot plant reactor equipped with a stirrer, a reflux condenser and metering devices was initially charged at room temperature and under a nitrogen atmosphere with a mixture consisting of 70.0 kg of deionized water and 1.21 kg of an aqueous polystyrene seed latex (solids content 33% by weight, average particle diameter 30 nm), and heated up to 93° C. under atmospheric pressure while stirring. Subsequently, 5% by weight of feed 1 were metered into the initial charge. After five minutes, commencing simultaneously, the remainder of feed 1 and the entirety of feed 2 were metered in continuously at constant rates, with metered addition of the remainder of feed 1 within 195 minutes and of the entirety of feed 2 within 180 minutes. Feed 1 consisted of 21.6 kg of a 7% by weight aqueous solution of sodium persulfate. Feed 2 consisted of a homogeneous emulsion produced from 65.9 kg of deionized water, 4.00 kg of a 28% by weight aqueous solution of sodium lauryl ether sulfate, 3.20 kg of a 15% by weight aqueous solution of sodium dodecylsulfate, 4.80 kg of glycidyl methacrylate, 1.12 kg of butane-1,4-diol diacrylate, 60.32 kg of methyl methacrylate, 91.52 kg of styrene and 2.24 kg of acrylic acid. After the addition of feed 1 had ended, stirring was continued for another 15 minutes. Subsequently, 110 g of TEGO® Foamex 822, a defoamer, were added. Thereafter, the aqueous polymer dispersion obtained was cooled down to 90° C. and then feeds 3 and 4 were added, commencing simultaneously, continuously at constant flow rates within 30 minutes. Feed 3 consisted of 800 g of a 10% by weight aqueous solution of tert-butyl hydroperoxide, and feed 4 consisted of 860 g of a 13.1% by weight aqueous solution of acetone bisulfite. Thereafter, the aqueous polymer dispersion obtained was cooled down to room temperature and filtered through a 125 μm filter. The aqueous polymer dispersion obtained had a solids content of 50% by weight. The number-average particle size was determined as 353 nm and the glass transition temperature as 107° C.

Production of an Aqueous Polymer P2 Dispersion in the Presence of a Polymer A (Dispersion 2)

Dispersion 2 was produced in an entirely analogous manner to dispersion 1, except that, in feed 2, 4.54 kg of glycidyl acrylate were used in place of glycidyl methacrylate, 1.06 kg of allyl methacrylate in place of butane-1,4-diol diacrylate, and 2.12 kg of 2-hydroxyethyl acrylate in place of acrylic acid.

The aqueous polymer dispersion obtained had a solids content of 52.7% by weight. The number-average particle size was determined as 321 nm and the glass transition temperature as 104° C.

Performance Studies

The studies were conducted with a 12 inch refiner from Antriz and a blowline connected thereto. The refiner was operated at 160 to 170° C. and an internal pressure of 5 to 6 bar (gauge). The distance between the two grinding plates was 0.3 mm, and one of the grinding plates was operated at 3000 revolutions per minute. The blowline (steel tube) connected to the refiner via a flange had an internal diameter of 3 cm and a tube length of 30 m. Through a 0.2 mm nozzle which was inserted at a distance of 50 cm from the refiner outlet/blowline inlet in the blowline wall, the aqueous binders were then injected into the blowline at 2 bar (gauge). At the end of the blowline was a cyclone separator, by means of which the coated wood fibers were dried further, cooled down to a temperature of about 80° C. and separated out into an open vessel.

For the studies, spruce woodchips that have been pretreated with water/steam at 160 to 170° C. at 5 to 6 bar gauge in a boiler were used, with the mass flow rate of woodchips into the refiner (or wood fibers into the blowline) set at 30 kg per hour.

The binders used were dispersions 1 and 2, and the comparative solution and the comparative dispersion. The binders were injected into the blowline through the 0.2 mm nozzle by means of an eccentric screw pump at a pressure of 2 bar (gauge), with the mass flow rates adjusted in each case to 4.8 kg of binder (calculated as solids) per hour. There was a test for each binder over 2 hours in the continuous steady state, with collection of the wood fibers sprayed with the respective binder in the open vessel over the course of this time.

After about 1 hour in the continuous steady state, wood fibers were taken from the wood fibers falling from the cyclone separator into the open vessel by sliding in a piece of black paper. A first visual assessment was undertaken by the naked eye with regard to the binder not bonded to the fibers, which was apparent as fine white dust on the black paper. In addition, the fibers obtained were subjected to a microscope assessment at 60-fold magnification. The results obtained with the different binders are listed in table 1 below.

TABLE 1

Results of the visual assessment of the coated fibers on the black paper and under the microscope

| Binder | Fine dust content on black paper | Microscope assessment |
|---|---|---|
| Dispersion 1 | No fine dust content apparent | Uniform distribution on the fibers |
| Dispersion 2 | No fine dust content apparent | Uniform distribution on the fibers |
| Comparative solution | No fine dust content apparent | Uniform distribution on the fibers |
| Comparative dispersion | High fine dust content | Barely any binder on the fibers apparent; separate powder |

Study of the Mechanical Properties

The fibers obtained from the blowline according to the aforementioned test procedures were used to produce 2 mm-thick 51×51 cm fiberboards having a density of 0.95 g/cm$^3$. For this purpose, 494 g of the fibers obtained were scattered homogeneously into a horizontal wood frame having internal dimensions of 51×51×30 cm (L/B/H). Thereafter, a 51×51 cm wooden board was placed horizontally onto the fiber web present within the wooden frame and the fiber web was subjected to preliminary compaction to a height of 5 cm with a ram in the middle. The fiber cake thus obtained was then taken out of the wooden frame, covered with a release paper on both square faces and compacted to a thickness of 2 mm between two 10 mm-thick horizontal separation plates at 200° C. under pressure at a compression rate of 10 seconds per mm, with the lower face of the fiber cake placed onto the lower horizontal separation plate in each case. Thereafter, the fiberboards obtained were left to cool down to room temperature outside the press.

The fiberboards thus obtained, depending on the binder used, are called FPD1 (fiberboard with dispersion D1), FPD2 (fiberboard with dispersion D2), FPVL (fiberboard with comparative solution) and FPVD (fiberboard with comparative dispersion).

The fiberboards obtained were used to conduct the following tests: visual assessment of the sedimentation characteristics and determination of the modulus of elasticity.

The sedimentation characteristics were tested by visually assessing the upper and lower faces of the respective board. In the absence of sedimentation, meaning good absorption characteristics of the binder onto the fibers, the upper and lower faces of the boards obtained looked the same. In the case of poor absorption characteristics of the binder onto the fibers, there was increased settling of fine dust on the lower face of the fiber cake when the fibers obtained from the blowline were scattered into the abovementioned wooden box. After the pressing operation, the boards obtained then showed a coarse fiber structure on the upper face and poor bonding of the fibers to one another, whereas the fibers were embedded into the binder and formed smooth surfaces on the lower face. The results obtained with the respective boards are listed in table 2.

The modulus of elasticity was determined in accordance with standard ISO 14125W4. The results obtained with the various binders produced boards produced (average from 3 determinations in each case) are likewise listed in table 2.

TABLE 2

Results of the sedimentation characteristics and the determination of the modulus of elasticity

| Fiberboards | Sedimentation characteristics | Modulus of elasticity [mPas] |
|---|---|---|
| FPD1 | no sedimentation apparent | 3370 |
| FPD2 | no sedimentation apparent | 3420 |
| FPVL | no sedimentation apparent | 3190 |
| FPVD | clear sedimentation apparent | 980 |

Forming of Test Specimens

Three 10×15 cm test specimens were sawn out of each of the aforementioned fiberboards FPD1, FPD2, FPVL and FPVD at room temperature. These test specimens were then placed into a heating cabinet heated up to 200° C. for 1 minute. Thereafter, the heated test specimens were placed rapidly into a cold compression mold, one side of which had a bulge in the form of a half-cylinder having a radius of 12.5 mm and the other side of which had an indentation in the form of a half-cylinder having a radius of 14.5 mm, and attempts were made to push the test specimens in. After 2 minutes, the test specimens had cooled down to room temperature and could be removed from the mold. Subsequently, the test specimens obtained were assessed visually. It was found that the test specimens obtained from the fiberboards FPD1 and FPD2 could be fitted easily to the semicircular curves of the mold, forming semicircular test specimens that had no cracks at all on the outer and inner surfaces. It was also possible to push the test specimens obtained from the fiberboard FPVD to the surface of the cold semicircular mold, but the semicircular test specimens that were obtained after cooling showed distinct cracking on the outer surface which already had the coarse fiber structure and poor bonding in the planar pressing operation. The test specimens obtained from the fiberboard FPVL were hard and brittle. In the attempt to push the corresponding test specimens into the mold, the test specimens each broke at the crests of the semicircular radii.

The invention claimed is:
1. A process for producing a thermoformable polymer/fiber composite, the process comprising:
   introducing a fibrous substrate into a gas stream;

contacting the fibrous substrate in the gas stream with an aqueous dispersion of a polymer P having a glass transition temperature Tg;

drying the fibrous substrate that has been contacted with the aqueous dispersion of the polymer P in the gas stream;

depositing the dried fibrous substrate to provide a deposited fibrous substrate;

converting the deposited fibrous substrate to a fiber web; and consolidating the fiber web at a temperature ≥Tg to give a thermoformable polymer/fiber composite;

wherein the aqueous dispersion of the polymer P is prepared by a free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and b) 0% to 20% by weight of at least one further ethylenically unsaturated monomer which differs from the monomers A1 [monomers A2]; and wherein the monomers P are chosen in terms of type and amount such that the polymer P obtained has a glass transition temperature Tg ≥20° C., measured according to DIN EN ISO 11357-2 (2013-09).

2. The process according to claim 1, wherein a weight ratio of polymer P to polymer A is ≥1 and ≤10.

3. The process according to claim 1, wherein the polymer A has a number-average molecular weight of ≥2000 and ≤20 000 g/mol.

4. The process according to claim 1, wherein the polymer A is formed to an extent of ≥95% by weight from monomers A1.

5. The process according to claim 1, wherein the monomers A1 are acrylic acid, methacrylic acid, maleic acid, and/or maleic anhydride.

6. The process according to claim 1, wherein the monomers P comprise:

≥90% by weight of at least one selected from the group consisting of olefins, vinylaromatic monomers, vinyl halides, esters of vinyl alcohol and monocarboxylic acids having 1 to 18 carbon atoms, esters of α,β-monoethylenically unsaturated monocarboxylic acids having 3 to 6 carbon atoms with alkanols having 1 to 12 carbon atoms, esters of α,β-monoethylenically unsaturated dicarboxylic acids having 3 to 6 carbon atoms with alkanols having 1 to 12 carbon atoms, and nitriles of α,β-monoethylenically unsaturated carboxylic acids and $C_{4-8}$-conjugated dienes; and ≤10% by weight of at least one selected from the group consisting of α,β-monoethylenically unsaturated monocarboxylic acids having 3 to 6 carbon atoms and amides thereof, α,β-monoethylenically unsaturated dicarboxylic acids having 3 to 6 carbon atoms and amides thereof, monoethylenically unsaturated compounds having at least one amino, epoxy, hydroxyl, N-methylol or carbonyl group, and compounds having at least two nonconjugated ethylenically unsaturated double bonds.

7. The process according to claim 1, wherein the polymer P is formed from:

≥90% and ≤99.9% by weight of styrene and/or methyl methacrylate;

≥0% and ≤9.9% by weight of n-butyl acrylate and/or 2-ethylhexyl acrylate; and

≥0.1% and ≤10.0% by weight of acrylic acid, methacrylic acid, glycidyl acrylate, glycidyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-aminoethyl acrylate, 2-aminoethyl methacrylate, 2-aminopropyl acrylate, 2-aminopropyl methacrylate, 3-aminopropyl acrylate, 3-aminopropyl methacrylate, butylene 1,4-glycol diacrylate, butylene 1,4-glycol dimethacrylate, 1,2-divinylbenzene, 1,3-divinylbenzene, 1,4-divinylbenzene, allyl acrylate, and/or allyl methacrylate;

where the amounts add up to 100% by weight.

8. The process according to claim 1, wherein the polymer P is formed from:

≥90% and ≤99.9% by weight of styrene and/or methyl methacrylate;

≥0% and ≤9.9% by weight of n-butyl acrylate and/or 2-ethylhexyl acrylate; and

≥0.1% and ≤2.0% by weight of butylene 1,4-glycol diacrylate, butylene 1,4-glycol dimethacrylate, 1,2-divinylbenzene, 1,3-divinylbenzene, and 1,4-divinylbenzene, allyl acrylate and/or allyl methacrylate;

where the amounts add up to 100% by weight.

9. The process according to claim 1, wherein the polymer P is formed from:

≥90% and ≤99.7% by weight of styrene and/or methyl methacrylate;

≥0% and ≤9.9% by weight of n-butyl acrylate and/or 2-ethylhexyl acrylate;

≥0.1% and ≤5.0% by weight of acrylic acid, methacrylic acid, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-aminoethyl acrylate, 2-aminoethyl methacrylate, 2-aminopropyl acrylate, 2-aminopropyl methacrylate, 3-aminopropyl acrylate, and/or 3-aminopropyl methacrylate;

≥0.1% and ≤2.0% by weight of butylene 1,4-glycol diacrylate, butylene 1,4-glycol dimethacrylate, 1,2-divinylbenzene, 1,3-divinylbenzene, 1,4-divinylbenzene, allyl acrylate, and/or allyl methacrylate; and ≥0.1% and ≤3.0% by weight of glycidyl acrylate and/or glycidyl methacrylate;

where the amounts add up to 100% by weight.

10. The process according to claim 1, wherein the fibrous substrate is a natural fiber.

11. The process according to claim 1, wherein the thermoformable polymer/fiber composite has a basis weight of ≥1000 and ≤30 000 g/m².

12. The process according to claim 1, wherein the thermoformable polymer/fiber composite is two-dimensional.

13. A process for producing a polymer/fiber molding, the process comprising: heating a thermoformable polymer/fiber composite prepared by introducing a fibrous substrate into a gas stream;

contacting the fibrous substrate in the gas stream with an aqueous dispersion of a polymer P having a glass transition temperature Tg;

drying the fibrous substrate that has been contacted with the aqueous dispersion of the polymer P in the gas stream;

depositing the dried fibrous substrate to provide a deposited fibrous substrate;

converting the deposited fibrous substrate to a fiber web; and consolidating the fiber web at a temperature ≥Tg to give a thermoformable polymer/fiber composite;

wherein the aqueous dispersion of the polymer P is prepared by a free-radically initiated emulsion polymerization of a mixture of ethylenically unsaturated monomers P [monomers P] in an aqueous medium in the presence of a polymer A, where the polymer A is formed from a) 80% to 100% by weight of at least one ethylenically unsaturated mono- and/or dicarboxylic acid [monomers A1] and b) 0% to 20% by weight of at least one further ethylenically unsaturated monomer which differs from the monomers A1 [monomers A2]; and wherein the monomers P are chosen in terms of type and amount such that the polymer P obtained has a glass transition temperature Tg ≥20° C., measured according to DIN EN ISO 11357-2 (2013-09) up to a temperature ≥Tg, converting the polymer/fiber composite thus obtained at a temperature ≥Tg to the desired shape of the polymer/fiber molding, and cooling the polymer/fiber molding obtained down to a temperature <Tg while retaining its shape.

14. The process according to claim 13, wherein the heating is preceded or followed by application of a two-dimensional decorative material to the polymer/fiber composite.

* * * * *